United States Patent [19]
Seigeot

[11] Patent Number: 5,681,983
[45] Date of Patent: Oct. 28, 1997

[54] TRACER GAS LEAK DETECTOR

[75] Inventor: Bertrand Seigeot, Dingy Saint Clair, France

[73] Assignee: Alcatel Cit, Paris, France

[21] Appl. No.: 644,581

[22] Filed: May 10, 1996

[30] Foreign Application Priority Data

May 12, 1995 [FR] France .................... 95 05671

[51] Int. Cl.$^6$ .................... G01M 3/20
[52] U.S. Cl. .................... 73/40.7
[58] Field of Search .................... 73/40.7

[56] References Cited

U.S. PATENT DOCUMENTS 4,083,231 4/1978 Mennenga .................... 73/40.7

FOREIGN PATENT DOCUMENTS 30 38 089 A1 5/1982 Germany.

Primary Examiner—Michael Brock
Attorney, Agent, or Firm—Sughrue, Mion, Zinn, Macpeak & Seas

[57] ABSTRACT

A tracer gas leak detector includes a mass spectrometer delivering a signal q proportional to the partial pressure of the tracer gas in the spectrometer, wherein the detector further includes apparatus for obtaining from the signal q a signal $$q' = A \frac{dq}{qt}$$

where A is an adjustable amplifier coefficient and dq/dt is the time derivative of the signal q, and apparatus for obtaining an output signal referred to as the processed signal of the form $q_t = q + q'$.

3 Claims, 4 Drawing Sheets

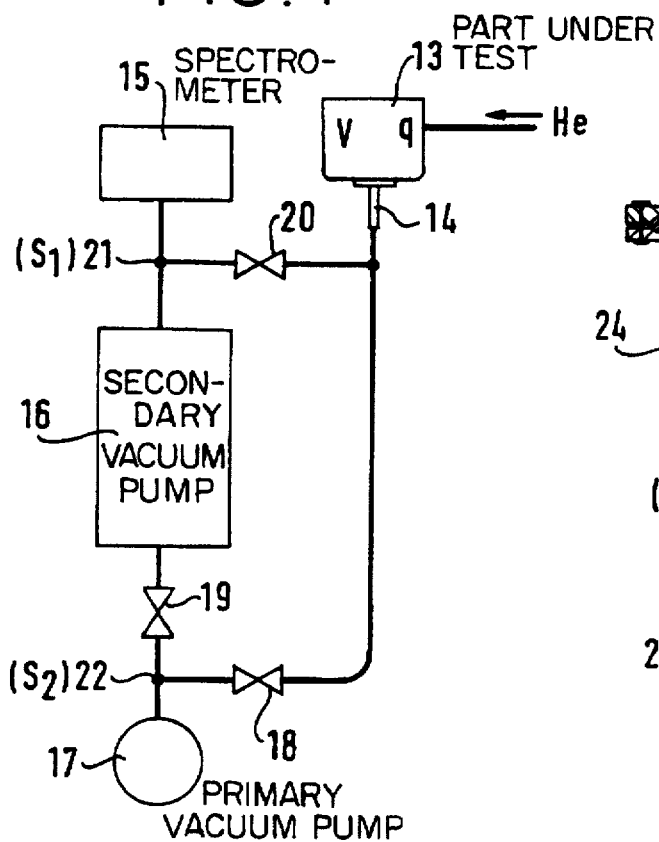
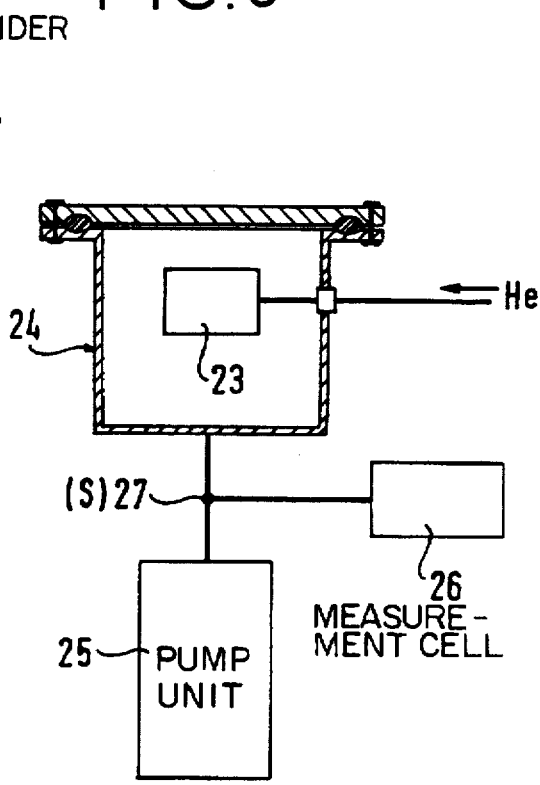
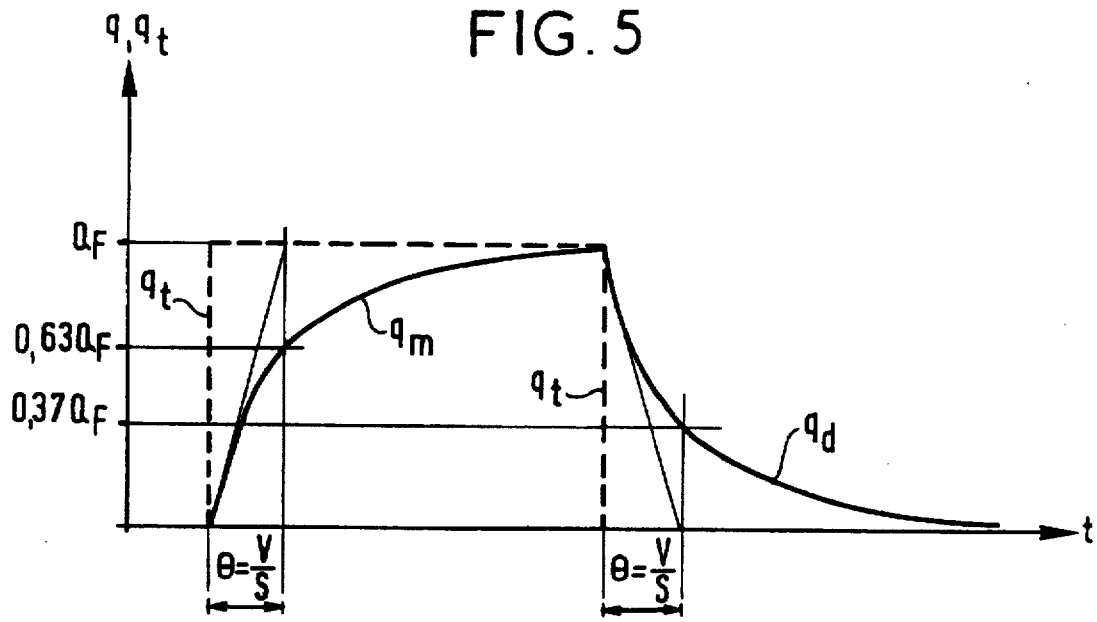

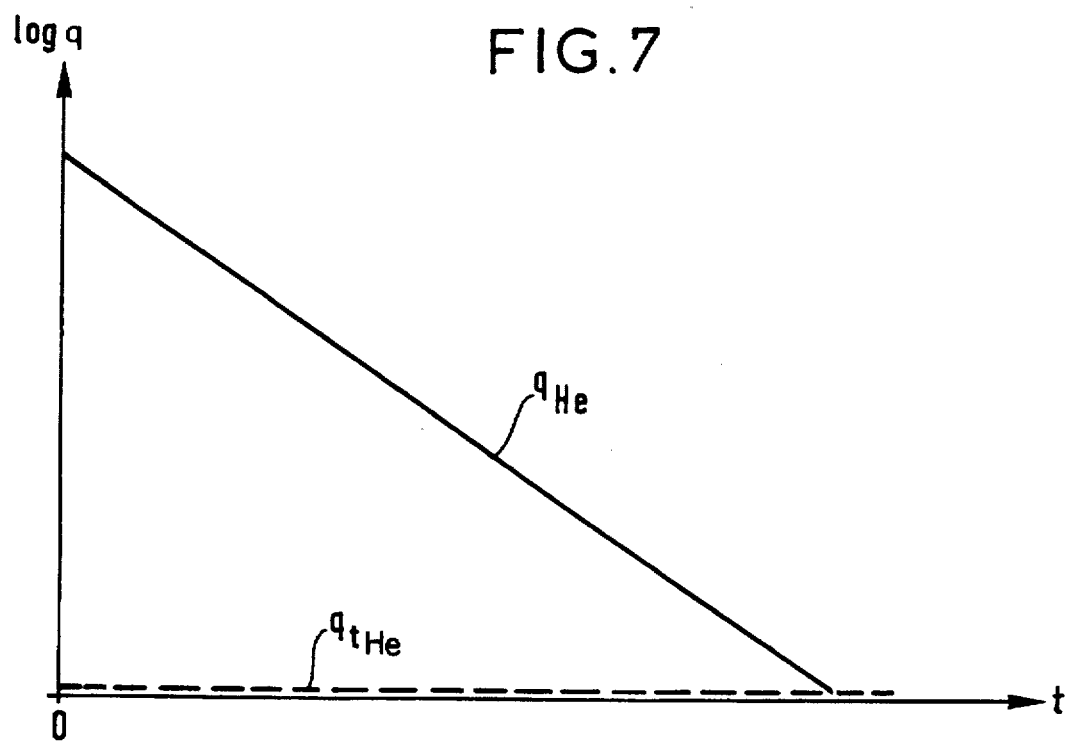
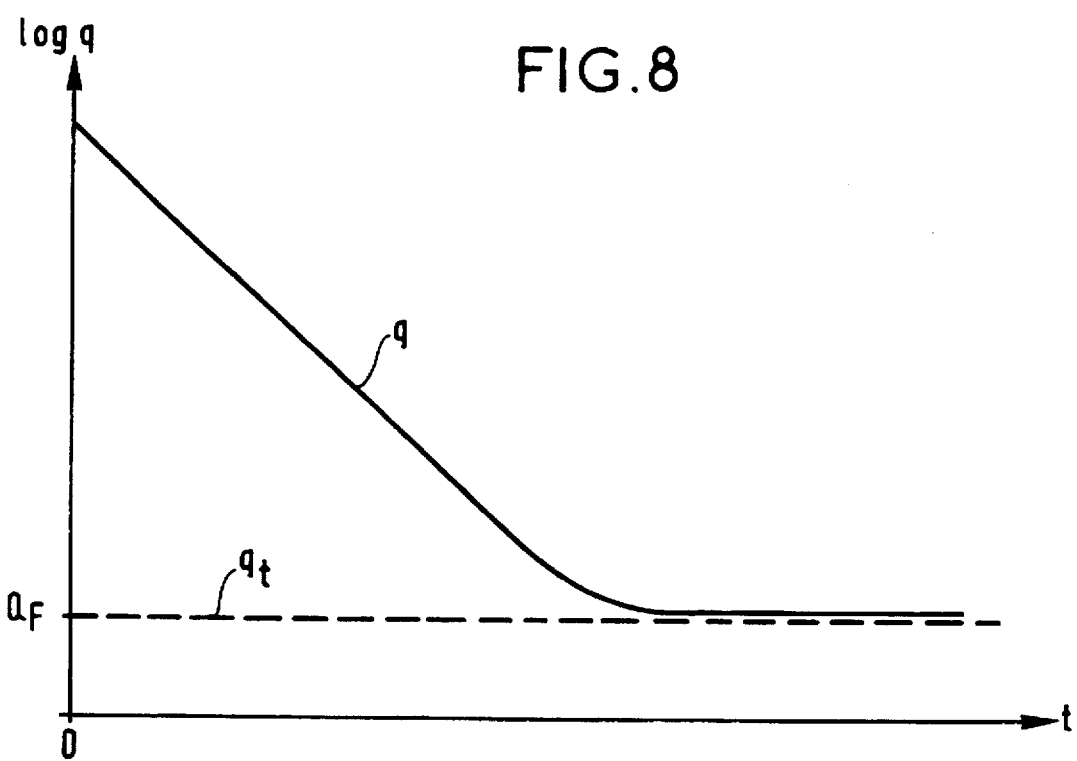

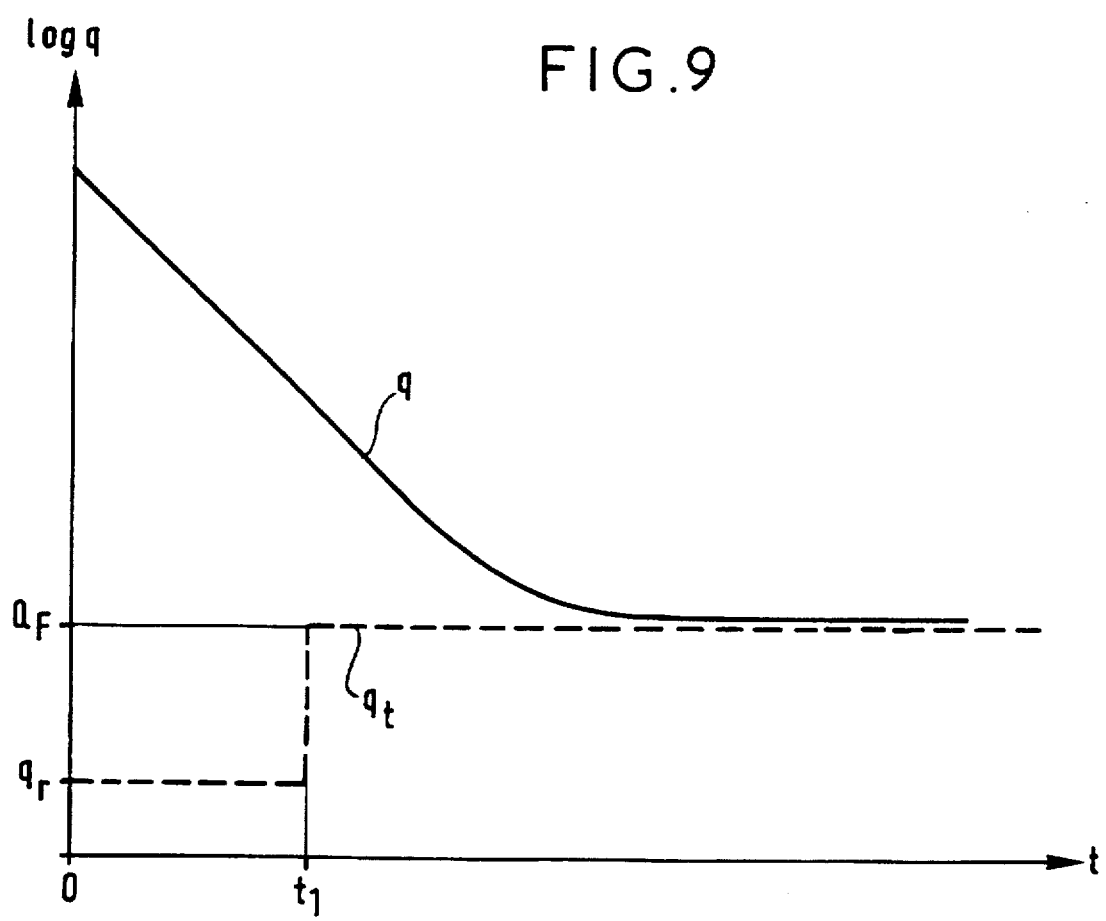

TRACER GAS LEAK DETECTOR

FIELD OF THE INVENTION

The present invention relates to a tracer gas leak detector comprising a mass spectrometer that delivers a signal q proportional to the partial pressure of the tracer gas in the spectrometer.

The invention proposes processing the signal q which is the signal as presently delivered by the detector and displayed on an analog or digital readout, with said processing being intended to improve the performance of the detector by providing an output signal having a better response time in the event of a leak, and also having better sensitivity.

BRIEF SUMMARY OF THE INVENTION

The invention thus provides a tracer gas leak detector comprising a mass spectrometer delivering a signal q proportional to the partial pressure of the tracer gas in the spectrometer, wherein the detector further includes means for obtaining from said signal q a signal $$q' = A \frac{dq}{dt}$$

where A is an adjustable amplifier coefficient and dq/dt is the time derivative of the signal q, and means for obtaining an output signal referred to as the processed signal of the form $q_t = q + q'$.

The value of the gain A is adjusted as a function of the type of test being performed: sniffer, vacuum, etc. . . . .

BRIEF DESCRIPTION OF THE DRAWINGS

The invention is described below for various leak testing configurations, with reference to the accompanying drawings, in which:

FIG. 4 is a diagram showing a detector that is performing a vacuum test;

FIG. 5 is a graph showing the rising and falling fronts $q_m$ and $q_d$ of the signal q, and also the corresponding output signal $q_t$ as processed by the means of the invention;

FIG. 6 is a diagram showing a detector performing a test on a part situated inside a sealed enclosure;

FIG. 7 shows ideal curves for the background noise signal $q_{He}$ and the processed background noise signal $q_{tHe}$;

FIG. 8 shows practical background noise curves; and

FIG. 9 shows the curves q and $q_t$ applicable to FIG. 6 when combined with background noise and a leak.

MORE DETAILED DESCRIPTION

Figure 1:
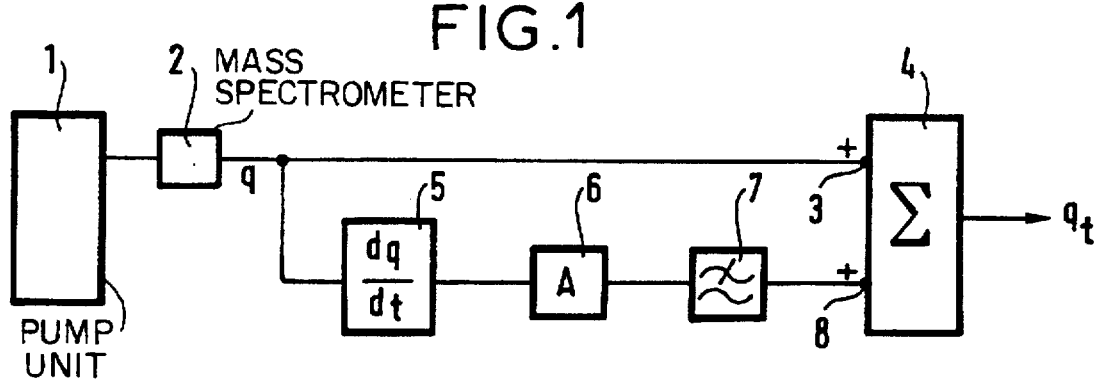
FIG. 1 is a block diagram of a tracer gas leak detector of the invention.

With reference to FIG. 1, there can be seen a leak detector of the invention which conventionally comprises a pump unit 1 of a mass spectrometer 2 which delivers an output signal q. The signal q is proportional to the partial pressure of the gas for which the spectrometer is adjusted, and present in the spectrometer. The pump unit 1 is a unit as used in any known detector and it operates in various known leak detection modes: sniffing, vacuum, etc. . . . .

In accordance with the invention, means are added to obtain at the output of the detector a signal:

$$q_t = q + A \frac{dq}{dt}$$

Thus, the signal q is delivered firstly to a first input 3 of a summing circuit 4 and secondly to a differentiating circuit 5. The differentiated signal is then amplified by an amplifier 6 of gain A and is passed via a lowpass filter 7 to eliminate high frequency signals that are not characteristic of a leak, to a second input 8 of the summing circuit 4, whose output provides the output signal $q_t$. In known manner, this signal is applied to an analog or digital display device.

The gain A of the amplifier is adjustable and it is adjusted depending on the kind of test being performed and on the desired effect.

Figure 2:
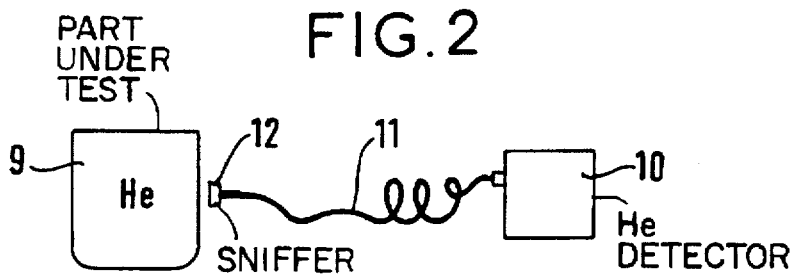
FIG. 2 is a diagram showing a sniffer test.
Figure 3:
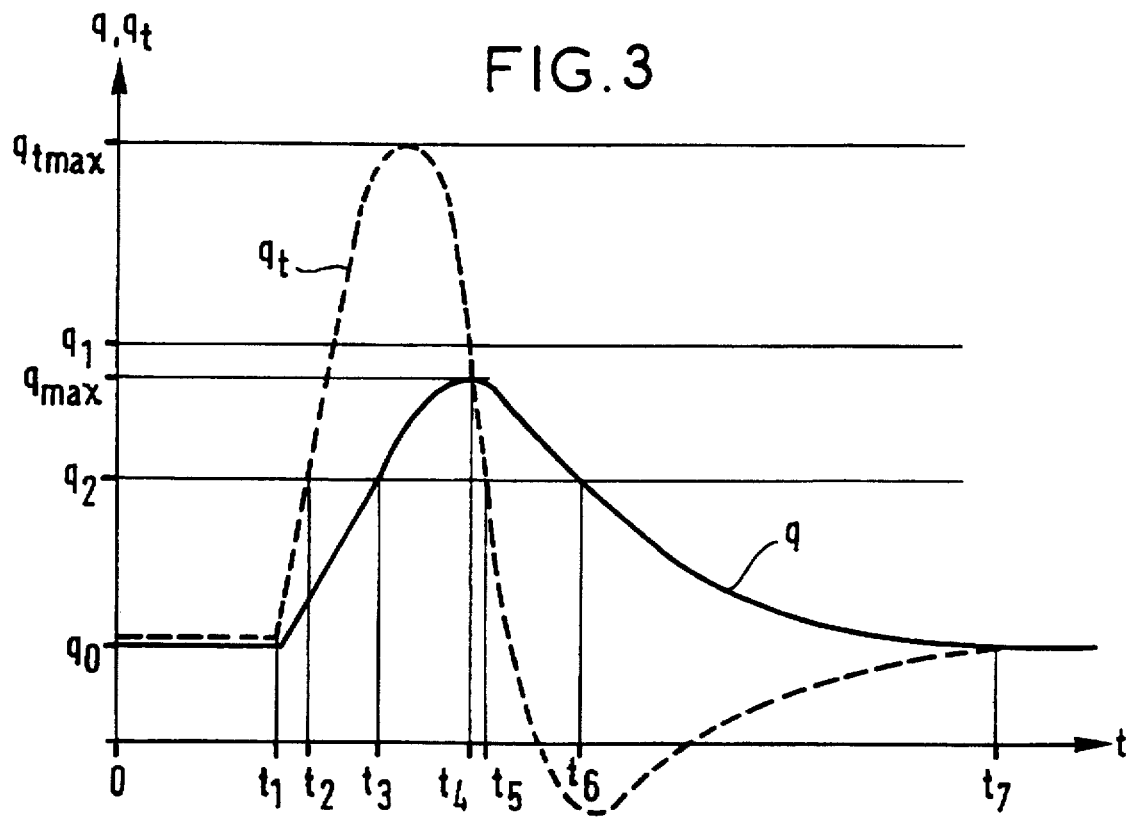
FIG. 3 is a graph showing firstly the signal q as delivered by a prior art detector when operating as a sniffer as shown in FIG. 2 and detecting a leak, and secondly the signal $q_t$ as delivered under the same conditions by a detector of the invention fitted with the means shown in FIG. 1.

FIGS. 2 and 3 show the invention as applied to a sniffer test: FIG. 2 shows an enclosure 9 to be inspected which has previously been pressurized with tracer gas, e.g. helium. A detector 10, such as that shown in FIG. 1, is used in sniffer mode via a pipe 11 and a probe 12. When the probe passes a leak, a signal q is obtained at the output from the spectrometer 2 (FIG. 1) and, as a function of time t, this signal is of the type shown in FIG. 3 (solid line curve referenced q).

Prior to time $t_1$ and after time $t_7$, the value $q_0$ of the curve q corresponds to the value of the signal q in the absence of a leak and due to the presence of helium in the atmosphere. This portion of the signal is called "background noise". The presence of such background noise is intrinsic to detection in sniffer mode, and it constitutes a major drawback of this mode of detection since it is the reason why sensitivity is less good than with a vacuum test.

The signal q is the output signal from a conventional prior art detector.

FIG. 3 also shows the signal:

$$q_t = q + A \frac{dq}{dt}$$

which is the output signal from the detector of the invention as obtained by processing the signal q in the manner shown in FIG. 1. The signal $q_t$ is plotted as a dashed line.

On examining this figure, and assuming that the operator has selected a rejection threshold for the part 9 under test equal to $q_1$, it can be seen that with the prior art signal q the leak is not detected and only the processed signal $q_t$ of the invention makes it possible to detect the leak, thereby providing much greater sensitivity, and also providing a signal-to-noise ratio $q_{tmax}/q_0$ that is much better.

If the operator had selected a lower threshold $q_2$, then it can be seen that the leak would indeed be detected by both of the signals q and $q_t$; however, in this case the signal $q_t$ responds more quickly: it responds at time $t_2$, without having to wait until time $t_3$. Also, the time after which the signal has dropped back beneath the threshold $q_2$ is likewise much shorter with the processed signal $q_t$. This occurs at time $t_5$, instead of $t_6$ as applies to the signal q.

Thus, the detector of the invention makes it possible to increase very considerably the performance of a sniffer test, both in terms of response time (to the appearance and disappearance of the signal) and in sensitivity, with this being achieved by amplifying the transient conditions that characterize a leak.

The gain A of the amplifier 6 may be automatically variable as a function of the sign of the derivative of the signal q, or even as a function of its absolute value. Thus, a negative value for the signal $q_t$ can be restricted or avoided by reducing the gain A such that after time $t_4$ the derivative of the signal q becomes negative.

The filter 7 (FIG. 1) is used to eliminate high frequency components such as electrical interference that are not characteristic of a leak.

With reference now to FIGS. 4 and 5, there follows a description of an embodiment in which the detector of the invention is used in a vacuum test by spraying.

FIG. 4 shows a part to be tested 13 connected by a duct 14 to a detector including a spectrometer 15 fitted with means for processing the signal q to obtain the output signal $q_t$ of the invention. The spectrometer 15 is pumped by a pump unit that includes a secondary pump 16 and a primary pump 17. The detector also includes valves 18, 19, and 20 in conventional manner.

After the primary pump 17 has established a preliminary vacuum in the part 13 under test, with the valves 19 and 20 closed while the valve 18 is open, testing proper takes place either in direct mode with the valves 19 and 20 open and the valve 18 closed, or else in counterflow mode, with the valve 20 closed and the valves 18 and 19 open.

In the first case, if the part under test has a leak, and if it is sprayed with helium, then the leakage flow q passes via the point 21 where the pumping speed is $S_1$. The helium partial pressure $P_{21}$ at this point is that which obtains inside the spectrometer 15, and this partial pressure is given by $P_{21}=q/S_1$. If the pumping speed $S_1$ of the pump 16 is constant, which is approximately true, then the partial pressure $P_2$ can be seen to be proportional to the leakage flow q.

In the second case, (counterflow test) the leakage flow q passes via point 22 where the pumping speed is $S_2$. In this case, the partial pressure of helium at 22 is $P_{22}=q/S_2$. However, the partial pressure of helium at 21, i.e. in the spectrometer 15, is equal to that at 22 divided by the compression ratio of the pump 16. Thus, if the pumping speed $S_2$ of the primary pump is constant, which is approximately true, then the partial pressure of helium as measured by the spectrometer is proportional to the leakage flow q in this case also.

It can thus be said that the spectrometer measures the leakage flow q.

Thus, if the internal volume of the part 13 is V and if it is evacuated by a vacuum pump of pumping speed S, and if the part has a leak and is sprayed in tracer gas, then the gas flow q as measured by the spectrometer 15 will satisfy the relationship:

$$q=Q_F(1-e^{-St/V})$$

where $Q_F$ is the final value of the flow;

S is the volume flow rate; and

V is a volume, with the ratio $V/S=\theta$ having the dimension of time.

Replacing V/S by $\theta$ in the above equation, gives:

$$q=Q_F(1-e^{-t/\theta})$$

If t is set to $\theta$, then $q=0.63\ Q_F$. This time $\theta$ is called the "response time". It is the time required to reach 63% of the final value $Q_F$ of the signal q.

Similarly, when the leak ceases to be sprayed, the leakage flow measured by the detector decreases as follows:

$$q=Q_F e^{-St/V} \rightarrow q=Q_F e^{-t/\theta}$$

if t is set to $\theta$, then $q=0.37\ Q_F$.

FIG. 5 shows these two curves in q: a rising front $q_m$ and a falling front $q_d$ in the signal q which is drawn as a continuous bold line. This is the signal q of FIG. 3 as delivered at the output of a prior art leak detector. The graph of FIG. 5 shows the "response" time $\theta=V/S$. This is the time required, starting from the beginning of spraying, to reach 63% of the value of the final signal of value $Q_F$. It is also the time, from the end of spraying, required for said signal to drop back to 37% of its maximum value.

If the volume V of the part under test is 120 liters, and the pumping speed S is 2 liters per second, then $V/S=\theta=60$ seconds.

That time is very long.

With the detector of the invention, the output signal $$q_t = q + A\frac{dq}{dt}$$

In this vacuum test, the value A of the gain of the amplifier 6 is selected to be equal to $\theta$ so that $Q=V/S=\theta$, thus $$q_t = q + \theta\frac{dq}{dt}$$

when the signal is established, it has been shown that $$q=Q_F(1-e^{-t/\theta})$$

so $$q_t=Q_F(1-e^{-t/\theta})+\theta(Q_F/\theta)e^{-t/\theta}$$

$$q_t=Q_F-Q_F e^{-t/\theta}=Q_F$$

$$q_t=Q_F$$

The processed signal $q_t$ is immediately equal to the final value $Q_F$.

Similarly, on disappearance of the signal, it has been shown that $Q_F=e^{-t/\theta}$.

Thus giving $$\begin{aligned}q_t &= q+\theta\frac{dq}{dt}\\ &= Q_F e^{-t/\theta}+\theta(-Q_F/\theta)e^{-t/\theta}\\ &= Q_F e^{-t/\theta}-Q_F e^{-t/\theta}=0\\ q_t &= 0\end{aligned}$$

The processed signal $q_t$ returns immediately to 0 when the leaky part ceases to be sprayed.

The output signal $q_t$ from the detector of the invention is plotted as a dashed line in FIG. 5.

Thus, in vacuum testing, the invention makes it possible to have a response that is theoretically instantaneous, providing the response time $\theta=V/S$ is known and providing the gain A of the amplifier 6 is selected to have said value $\theta$.

The pumping speed S is generally known, and it is generally possible to know the volume V of the part under test, at least approximately.

Thus, with a small detector and a low pumping speed, it is possible to obtain response times that are much shorter than those of a much larger and much higher performance tester. This makes it much easier to locate a leak.

Finally, with reference to FIGS. 6 to 9, we examine the case of the part under test 23 being placed in a sealed enclosure 24 from which air is evacuated by a pump unit 25. The measurement cell is shown at 26.

Let the volume of the enclosure 24 (not included in the part 23) be V and let the pumping speed at point 27 be S and the initial pressure of air in the enclosure 24 be $P_i$.

The air flow $q_{air}$ pumped at 27 is $q_{air}=S.P_{air}$.

Since the natural concentration of helium in air is $5\times10^{-6}$, we have: $q_{He}=S.P_{air}\times5\times10^{-6}$.

Also, the pressure of air $P_{air}$ as a function of time in the enclosure 24 is given by the equation:

$$P_{air}=P_i e^{-St/V}$$

Whence $$q_{He}=5\times10^{-6}S\times P_i e^{-St/V}$$

$$q_{He}=ke^{-St/V}$$

with this helium flow corresponding to the natural helium content of air and being measured by the cell 26, thus constituting background noise that decreases.

This background noise is represented by a continuous line in FIG. 7 where the abscissa represents time and the ordinate log $q_{He}$. When the signal $q_{He}$ is processed by the means of the invention, it becomes $$q_{tHe} = q_{He} + A\frac{dq_{He}}{dt}$$

$$q_{tHe} = q_{He} + A(-kS/V)e^{-St/V}$$

writing V/S=θ, gives $$q_{tHe}=Ke^{-t/\theta}+A(-k/\theta)e^{-t/\theta}$$

if A is selected to be equal to θ, then $$q_{tHe}=0$$

The background noise due to helium in the atmosphere is immediately eliminated. Thus, by avoiding background noise interference, it is possible to start testing while the pressure in the enclosure 24 is still high.

In practice, residual background noise remains due to degassing from the walls and/or elastomer gaskets present in the chamber 24. In addition, if the part 23 has a leak and helium is present in the part under test from the start, then the measured flow q will end up as $Q_F$. (Where $Q_F$ is the sum of the residual background noise and the final leakage under stable conditions.)

This gives:

$$q=q_{He}+Q_F=Ke^{-St/V}+Q_F$$

so the processed signal $q_t$ then becomes:

$$q_t=q+A\frac{dq}{dt}$$

and writing A=θ=V/S, we have:

$$q_t=ke^{-t/\theta}+Q_F+\theta(-k/\theta)e^{-t/\theta}$$

$$q_t=Q_F$$

These two curves q and $q_t$ (logq and log$q_t$) are given in FIG. 8. Thus, from the beginning of pumping, the leak or the residual background noise (or the sum of both) can be seen clearly since the processed signal $q_t$ eliminates the background noise due to helium of the atmosphere in enclosure 24.

If helium is not present in the part under test 23 from the start, but is injected at time $t_1$ after pumping has been going on for a certain length of time, then the following effect is obtained on the processed signal $q_t$ (still selecting a gain value A to be of value θ=V/S):

eliminination of background noise due to atmospheric helium in the enclosure 24;

immediate appearance of the final residual background $q_r$; and the appearance, at instant $t_1$ when tracer gas (He) is injected into the part under test 23, of the final signal $Q_r=q_r+q_{final\ leak}$.

FIG. 9 shows the signal q and the signal $q_t$ (logq and log$q_t$) delivered by the invention at the output from the summing circuit 4.

For perceiving a leak, it can clearly be seen that there is a very large difference in signal/noise ratio when using the processed signal $q_t$, whereas, in contrast, the leak remains masked for a long time by background noise due to atmospheric helium when looking at the non-processed signal q of the prior art.

When a test is performed in a vacuum as in FIG. 4, while the part is being sprayed with helium prior to all of the air being completely evacuated from the part, then the same curve is obtained as in FIG. 9.

This shows up all of the advantages of the detector of the invention which makes the following possible:

an increase in throughput;

a reduction in the power and thus in the cost of pumping systems;

measurement that is more reliable;

the capability of vacuum testing can be used to the full at high pressure because background noise is eliminated;

response time and test sensitivity when performing sniffer testing that are improved; and the test capacities of detectors can be extended to greater volumes without requiring additional pumping.

I claim:

1. A tracer gas leak detector comprising a mass spectrometer delivering a signal q proportional to the partial pressure of the tracer gas in the spectrometer, wherein the detector further includes means for obtaining from said signal q a signal $$q'=A\frac{dq}{qt}$$

where A is an adjustable amplifier coefficient and dq/dt is the time derivative of the signal q, and means for obtaining an output signal referred to as the processed signal of the form $q_t=q+q'$.

2. A leak detector according to claim 1, used for performing a leak test on a part of internal volume V which, while measurement is being performed, is connected to a vacuum pump of the detector providing a suction pumping speed S, the suction of said pump also being connected directly, or via one or more other pumps in series, to said mass spectrometer, wherein said coefficient A is selected to be equal to V/S.

3. A leak detector according to claim 1, used for performing a leakage test on a part pressurized with tracer gas and placed in a sealed enclosure of internal volume, not including said part, equal to V, and connected, while measurement is being performed, to a vacuum pump of the detector providing suction at a pumping speed S, the suction of said pump being also connected, either directly or via one or more other pumps in series, to said mass spectrometer, the detector being wherein said coefficient A is selected to be equal to V/S.

* * * * *